J. J. Bausch's Eye Glasses,
73285

PATENTED
JAN 14 1868

Witnesses.
N. C. Ashkettle
Theo Insche

Inventor:
J. J. Bausch
per
Attorneys

United States Patent Office.

J. J. BAUSCH, OF ROCHESTER, NEW YORK.

Letters Patent No. 73,285, dated January 14, 1868.

---

IMPROVEMENT IN EYE-GLASSES AND SPECTACLES.

---

*The Schedule referred to in these Letters Patent and making part of the same.*

---

TO ALL WHOM IT MAY CONCERN:

Be it known that I, J. J. BAUSCH, of Rochester, in the county of Monroe, and State of New York, have invented a new and useful Improvement in Eye-Glasses and Spectacles; and I do hereby declare that the following is a full, clear, and exact description thereof, which will enable others skilled in the art to make and use the same, reference being had to the accompanying drawings, forming part of this specification.

This invention consists in constructing or arranging eye-glasses or spectacles in such a manner that the two parts which contain the lenses may be adjusted in such relation to each other and to the eyes of the wearer that the lenses, when the eye-glasses or spectacles are adjusted on the nose, will have a proper relative position with the eyes.

It is a well-known fact that in the use of eye-glasses or spectacles, when the lenses of such eye-glasses or spectacles are not fitted in such a manner as to bring the centre of each lens exactly in front of the centre of each corresponding eye, all objects appear more or less distorted, and the eyes will be subject to a painful strain. To such perfect fitting of the lenses in all cases, the great variety in the forms of human faces presents, however, a serious difficulty, owing principally to the difference in the distance by which the eyes are separated in the faces of different persons, while in the case of eye-glasses without side bows, the difference in the shape of noses of different persons has presented an additional difficulty, not only in bringing the centre of each lens in front of each corresponding eye, but also in fitting such eye-glasses or spectacles to the nose so as to make them adapt themselves to the shape of it, and sit firmly on the same without discomfort to the wearer, all of which the eye-glasses or spectacles hitherto constructed accomplish only imperfectly, although various modes have been tried to remedy the defects above mentioned. My improvement meets the above-named difficulties. In the accompanying sheet of drawings—

Similar letters of reference indicate corresponding parts.

Figure 1:
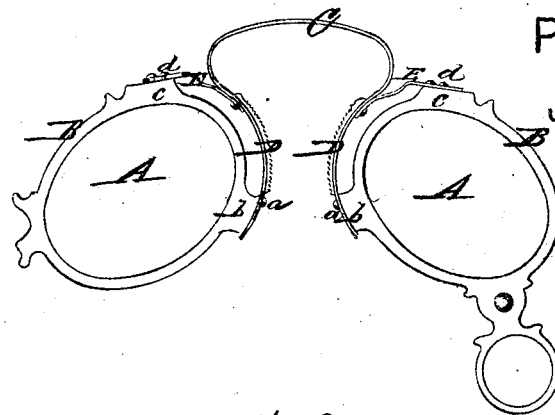
Figure 1 represents a pair of eye-glasses provided with my improvement.

A A, fig. 1, represent the lenses of a pair of eye-glasses, and B B the portions of the frame in which the lenses are fitted, and C the spring which connects the two parts B B of the frame, and which, by its pressure, holds the frame on the nose of the wearer or user. The spring C terminates at $b$, in a movable slide or fork, and is attached to the lower part of frame B, by screws, $a$, or by any similar method, in such a manner as to admit of the spring C being adjusted higher or lower, as may be desired. E E represent small bars or rods, which are attached at one end to the spring C, and on the opposite end, $e$, to frame B by screws $d$, in a similar manner as spring C is attached at $b$. This admits of E E being adjusted in the direction of their length, so that the lenses may be spread apart or drawn together, as may be desired.

Figure 2:
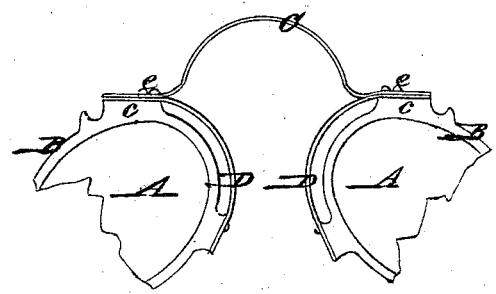
Figure 2 represents a slight modification of the same, the two forms of springs represented in these two figures being those most generally used in this class of eye-glasses.

In fig. 2, spring C terminates in movable slides or forks on the upper part of the frame B at $a$, and is attached to it by screws $e$. The pressure-strips or nose-pieces D D, which are formed in fig. 1 by spring C, are attached at their upper ends to the frame B at $a$, beneath the spring C, with the same screws with which spring C is secured, oblong slots being made in them through which the screws pass. On the lower ends these pressure-strips are attached to the frame B at the same point and in a similar manner as spring C to frame B, in fig. 1.

It will be seen that by means of this adjustment of the spring C and the pressure-strips D D, the upper and lower part of each of the lens-frames can be readily brought nearer to the nose or further away from it, as the circumstances of the case may require, whether these circumstances arise from the conformation of the eyes or the peculiar shape of the nose of the wearer, so as to bring each lens into the proper position before each corresponding eye.

Having thus described my invention, what I claim as new, and desire to secure by Letters Patent, is—

The combination of the connecting-spring C, guards D, and plates E, adjustably attached to the bows B, substantially as described and for the purpose specified.

Dated at Rochester, New York, November 29, 1867.

J. J. BAUSCH.

Witnesses:
   WM. GRAEBE,
   THOMAS DRANSFIELD.